(12) United States Patent
Halloran et al.

(10) Patent No.: US 6,479,583 B2
(45) Date of Patent: Nov. 12, 2002

(54) POLYMERIZATION OF SILICONE MICROEMULSIONS

(75) Inventors: Daniel Joseph Halloran, Midland, MI (US); Randal Myron Hill, Midland, MI (US); Burt Michael Wrolson, Midland, MI (US); Brett Lee Zimmerman, Birch Run, MI (US)

(73) Assignee: Dow Corning Corporation, Midland, MI (US)

( * ) Notice: Subject to any disclaimer, the term of this patent is extended or adjusted under 35 U.S.C. 154(b) by 20 days.

(21) Appl. No.: 09/754,933

(22) Filed: Jan. 8, 2001

(65) Prior Publication Data

US 2002/0091193 A1 Jul. 11, 2002

(51) Int. Cl.$^7$ .................. C08G 77/12; C08L 83/00; B01F 3/08
(52) U.S. Cl. .................. 524/837; 524/266; 524/588; 516/55
(58) Field of Search .................. 516/55; 528/31; 524/266, 588, 837

(56) References Cited

U.S. PATENT DOCUMENTS

| | | | |
|---|---|---|---|
| 3,419,593 A | 12/1968 | Willing et al. | 528/31 |
| 3,715,334 A | 2/1973 | Karstedt | 528/31 |
| 3,814,730 A | 6/1974 | Karstedt | 528/30 |
| 3,900,617 A | 8/1975 | Grenoble | 528/31 |
| 3,923,705 A | 12/1975 | Smith | 528/31 |
| 4,248,751 A | 2/1981 | Willing | 528/31 |
| 4,791,029 A * | 12/1988 | Fau et al. | 524/375 |
| 4,870,149 A * | 9/1989 | Hara et al. | 525/478 |
| 5,126,072 A * | 6/1992 | Traver | 106/287.14 |
| 5,175,325 A | 12/1992 | Brown et al. | 556/9 |
| 5,777,017 A * | 7/1998 | Funk et al. | 106/2 |
| 6,013,682 A | 1/2000 | Dalle et al. | 516/55 |

* cited by examiner

Primary Examiner—Daniel S. Metzmaier
(74) Attorney, Agent, or Firm—Jim L. De Cesare

(57) ABSTRACT

Emulsions and latexes containing polymer particles with a diameter greater than 0.02 micron are prepared by (i) forming a microemulsion containing particles of oligomers with a diameter less than 0.02 micron by combining water, a surfactant, a hydride functional organosilicon oligomer or a mixture of such oligomers, and an alkenyl functional organosilicon oligomer or a mixture of such oligomers; (ii) adding a catalyst to the microemulsion; (iii) initiating polymerization of the oligomers; and (iv) continuing polymerization until an emulsion or latex is formed containing polymer particles with a diameter greater than 0.02 micron.

4 Claims, No Drawings

POLYMERIZATION OF SILICONE MICROEMULSIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to emulsions and latexes prepared by forming a microemulsion of water, a surfactant, a hydride functional organosilicon oligomer or a mixture of such oligomers, and an alkenyl functional organosilicon oligomer or a mixture of such oligomers, and polymerizing the oligomer containing microemulsion until an emulsion or latex is formed containing polymer particles.

BACKGROUND OF THE INVENTION

Silicone emulsion polymerization is a known technique for preparing silicone emulsions. The technique utilizes organosiloxane precursors, typically cyclosiloxanes or alkoxysilanes, which are substances capable of diffusion into or through water in their original form or when hydrolyzed. In silicone emulsion polymerization, siloxane polymers are formed from siloxane precursors and new emulsion particles are formed containing siloxane polymers formed during the polymerization process.

Confusion often is found in the literature as to what is meant by emulsion polymerization as it pertains to organosiloxane precursors. In this invention, emulsion polymerization means the process where new particles form that are characteristically smaller than the starting droplets of the organosiloxane precursor.

It should be noted that a key component enabling reactions to occur in silicone emulsion polymerization is a surface active catalyst, which has both the properties of a surfactant and a catalyst, described generally as a surfactant-catalyst. It is sometimes described as surfcat for the sake of brevity. Surfcats may be formed in situ in the emulsion polymerization process by ion exchange of a strong acid or base catalyst and an ionic surfactant that is the salt of a surface active strong acid or base, respectively. They can also be prepared beforehand by ion exchange of a strong acid or base catalyst and an ionic surfactant that is the salt of a surface active strong acid or base, respectively, in an aqueous solution.

The purpose of the surfcat is to catalyze the ionic polymerization of organosiloxane precursors to form particles containing siloxane polymers. Silicone emulsions that result from such a process, by design, contain ionic surfactants. The presence of ionic surfactants in silicone emulsions is unsatisfactory in applications where an electric charge on the particles is not desired. Therefore, a need exists for a silicone emulsion polymerization process that does not require a surfcat.

Hydrosilylation is a silicon-based reaction between silicon hydride and an unsaturated carbon bond that does not require an ionic catalyst.

While it's not new to form emulsions and latexes by polymerizing mixtures containing water, surfactants, catalysts, hydride functional organosilicon oligomers, and alkenyl functional organosilicon oligomers, i.e., U.S. Pat. No. 3,900,617 (Aug. 19, 1975) and U.S. Pat. No. 4,248,751 (Feb. 3, 1981), it is not known to polymerize microemulsions containing low molecular weight, low viscosity organosilicon oligomers by the hydrosilylation reaction.

In instances where low molecular weight, low viscosity organosilicon monomers have been used, i.e., U.S. Pat. No. 6,013,682 (Jan. 11, 2000), the monomers contained no more than two reactive sites, and therefore network polymers could not be obtained, nor films of elastomeric or resinous materials upon removal of water.

BRIEF SUMMARY OF THE INVENTION

The invention relates to a method for making emulsions or latexes that contain. polymer particles with a diameter greater than 0.02 micron (micrometer). The steps of the method generally involve the formation of a microemulsion that contains particles of one or more reactive siloxane oligomers having a diameter less than 0.02 micron (micrometer). The microemulsion is formed by combining water, at least one surfactant, a hydride functional organosilicon oligomer, and an alkenyl functional organosilicon oligomer. A catalyst is added to the microemulsion, and polymerization of the oligomers is initiated. Polymerization is allowed to continue until an emulsion or latex is formed containing polymer particles with a diameter greater than 0.02 micron (micrometer).

The oligomers each have a viscosity of 1–50 centistoke ($mm^2/s$), and at least one oligomer contains more than two reactive sites.

While it is preferred to form the microemulsion in a single step by combining water, the surfactant, the hydride functional organosilicon oligomer, and the alkenyl functional organosilicon oligomer, and then adding the catalyst to the microemulsion; two separate microemulsions, each containing one of the oligomers, can be prepared and then combined, in which case the catalyst is included in the microemulsion containing the alkenyl functional organosilicon oligomer.

The emulsions and latexes resulting from these processes can be used in various applications such as hair fixative agents, release agents, and as thickening agents for low molecular weight silicone oils.

Cured films may be obtained by removing water from the resulting emulsion or latex. These films can be tailored to contain elastomeric or resinous polymers. Such films have utility as paper coatings, release coatings, and antifouling coatings, for example.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Emulsions and latexes according to this invention are obtained from microemulsions of water, a surfactant, a hydride. functional organosilicon oligomer, and an alkenyl functional organosilicon oligomer, by polymerizing the microemulsion via hydrosilylation to form an emulsion or latex.

Hydrosilylation

Hydrosilylation, as noted above, is a reaction involving addition of a silicon hydride to an unsaturated hydrocarbon to form a silicon-carbon bond. It is used commercially to synthesize organofunctional silicon monomers, to crosslink silicone polymers, and to connect a silicone to an organic polymer block to form a copolymer.

One example is hydrosilylation of an alpha-olefin with a methylhydrogen siloxane according to the general reaction $$\equiv SiH + CH_2=CH-R \rightarrow \equiv SiCH_2CH_2-R.$$

When used for crosslinking, such transition metal catalyzed hydrosilylation reactions typically involve reaction between a low molecular weight polysiloxane containing several Si-H groups and a high molecular weight polysiloxane containing at least two Si-vinyl groups, or vice versa.

Generally, equivalent molar amounts of the $\equiv$SiH groups and the unsaturated groups are employed in the process. It may be necessary, however, to use an excess of the reactant containing unsaturation to totally consume $\equiv$SiH in the siloxane product.

The maximum amount of transition metal catalyst employed is determined by economical considerations, and the minimum amount is determined by the type and purity of the reactants employed. Generally, very low concentrations of a platinum catalyst, such as $1 \times 10^{-10}$ moles catalyst per equivalent of the reactant containing unsaturation, are used when the reactants are extremely pure. However, it is possible to use about $1 \times 10^{-8}$ moles catalyst per equivalent weight of reactant containing unsaturation, and even $1 \times 10^{-7}$ to $1 \times 10^{-3}$ moles of catalyst per equivalent weight of reactant containing unsaturation.

Reaction temperature can vary, and optimum temperatures depend upon the concentration of catalyst and the nature of the reactants. The reaction can be initiated at a temperature below room temperature, i.e., 0° C., and is exothermic once it begins. For purposes of this invention, the temperature should be one at which both reactants are in a liquid state. The maximum temperature is determined by the range in which the microemulsion phase forms. It is preferred to operate the process such that the temperature is maintained above the lower critical temperature for microemulsion formation, and below the upper critical temperature for microemulsion formation. Ordinarily, it is best to keep the reaction temperature below about 100° C. Best results with most reactants are obtained by initiating the reaction at about 50–80° C. and maintaining the reaction within reasonable limits of this range. The exothermic nature of the reaction may require provisions for the removal of heat.

The optimum reaction time is variable depending upon the reactants, reaction temperature, and catalyst concentration. Ordinarily, there is no benefit in extending the contact time of reactants at the reaction temperature beyond 16 or 17 hours, but likewise there is usually no harm unless the resulting emulsion or latex stability is adversely affected. With many reactants, the reaction is complete in 30 minutes or less.

While the reaction can be carried out at atmospheric pressure, below atmospheric pressure, or above atmospheric pressure, for the sake of simplicity, atmospheric pressure is generally preferred.

Catalyst

As noted, hydrosilylation requires a catalyst to effect the reaction between the SiH containing reactant and the reactant containing unsaturation. For purposes of this invention, liquid or liquid dispersible forms of the catalyst are preferred. Suitable catalysts include Group VIII transition metals, and typically platinum is the metal of choice. One example of a platinum metal catalyst which can be used is platinum in the form of a reaction product of chloroplatinic acid and an organosilicon compound containing terminal aliphatic unsaturation described in U.S. Pat. No. 3,419,593 (Dec. 31, 1968).

Another suitable catalyst is Karstedt's catalyst described in U.S. Pat. No. 3,715,334 (Feb. 6, 1973) and U.S. Pat. No. 3,814,730 (Jun. 4, 1974). It is a platinum-vinylsiloxane substantially free of chemically combined halogen. Several other types of catalysts include deposited platinum and complexed platinum as described in U.S. Pat. No. 3,923,705 (Dec. 2, 1975).

Yet another suitable catalyst is a platinum-organosiloxane complex prepared by reacting platinous halide with an organosiloxane having 2–4 silicon bonded organic groups containing terminal olefinic unsaturation, in the presence of a polar organic liquid which is a partial solvent for the platinous halide, as described in U.S. Pat. No. 5,175,325 (Dec. 29, 1992).

Hydrosilylation can be initiated by catalysts other than Group VIII transition metals. For example, initiation can be induced by addition of a free radical initiator, or by photolysis, i.e., exposure to a light source such as ultraviolet light. Some examples of free radical initiators include peroxide type initiators, azo type initiators, and redox type initiators. Representative peroxide type initiators include diacyl peroxides, peroxyesters, dialkyl peroxides, and peroxydicarbonates, such as dibenzoyl peroxide, t-butyl peroxide, dicumyl peroxide, diisopropyl peroxy dicarbonate. An example of an azo initiator is 2,2-azobisisobutylonitrile. Examples of redox initiators are methylbutyl amine and dimethyl amine.

Monometers

Monomers suitable for use according to the invention near and cyclic organosilicon oligomers represented by one following six formulas.

The first type of monomer is represented by:

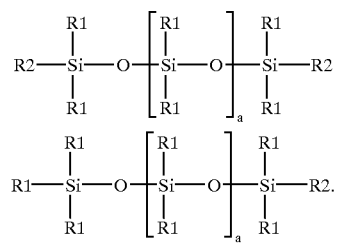

The second type of monomer is represented by:

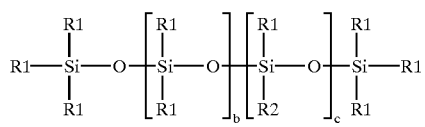

-continued

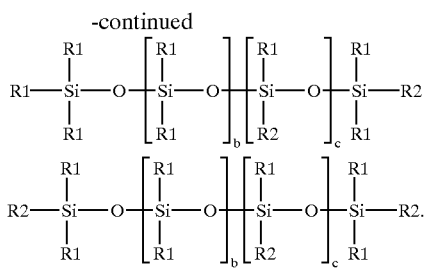

The third type of monomer is represented by:

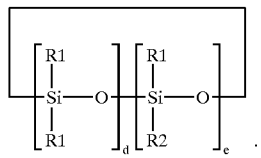

In the formulas, R1 represents an alkyl group containing 1–6 carbon atoms such as methyl, ethyl, propyl, isopropyl, butyl, pentyl, and hexyl. R1 can also be an aryl group such as phenyl. Preferably, R1 is methyl. R2 is the reactive group or site in the oligomeric molecule. R2 can be hydrogen or an alkenyl group. The value of a and b is 0–10, and the value of c is 1–10, provided the sum of b and c is 1–10. The value of d and e is 0–10, provided the sum of d and e is 3–10.

The alkenyl group is represented by the formula —$(CH_2)_f CH=CH_2$ in which f can be zero or f can have a positive value of one to about six. Preferably, R2 is a vinyl group, an allyl group, or a hexenyl group.

These monomers should have a viscosity of 1–50 centistoke ($mm^2/s$). The value of a, the value of the sum of b and c, and the value of the sum of d and e, should not exceed ten. This is for the reason that microemulsions can only be formed with low molecular weight, low viscosity organosilicon monomers.

In addition, at least one monomer used in the hydrosilylation reaction should have a functionality greater than two, i.e., it must contain more than two reactive sites in the molecule. This is necessary to form network polymers. Thus, by removing water from the composition, films of elastomeric or resinous materials can be provided.

Compositions particularly suitable for use herein are the hydride functional organosilicon oligomers 1,1,3,3-tetramethyldisiloxane, 1,3,5,7-tetramethylcyclotetrasiloxane, and 1,1,3,3,5,5,7,7-octamethyltetrasiloxane; and the alkenyl functional oligomers 1,3-divinyltetramethyldisiloxane and 1,3,5,7-tetravinyl-1,3,5,7-tetramethyl cyclotetrasiloxane.

Other compositions suitable as hydride functional organosilicon oligomers are 3H,5H-octamethyltetrasiloxane, 1,1,3,3,5,5-hexamethyltrisiloxane, methylhydrocyclosiloxane, methyltris(dimethylsiloxy)silane, phenylhydrocyclosiloxane, phenyltris(dimethylsiloxy)silane, and 1,1,3,3-tetraisopropyldisiloxane.

Other compositions suitable as alkenyl functional organosilicon oligomers are
1,3-diallyltetrakis(trimethylsiloxy)disiloxane,
1,3-diallyltetramethyldisiloxane,
1,3-divinyl-1,3-diphenyl-1,3-dimethyldisiloxane,
1,5-divinyl-3,3-diphenyltetramethyltrisiloxane,
1,5-divinylhexamethyltrisiloxane,
1,5-divinyl-3-phenylpentamethyltrisiloxane,
divinyltetrakis(trimethylsiloxy)disiloxane,
divinyltetraphenyldisiloxane,
pentavinylpentamethylcyclopentasiloxane,
tetrakis(vinyldimethylsiloxy)silane,
1,1,3,3-tetravinyldimethyldisiloxane,
tris(vinyldimethylsiloxy)methylsilane,
tris(vinyldimethylsiloxy)phenylsilane,
1,3,5-trivinyl-1,1,3,5,5-pentamethyltrisiloxane, and
1,3,5-trivinyl-1,3,5-trimethylcyclotrisiloxane.

Surfactants

The first step in the process according to the invention is to form a microemulsion of a monomer or a mixture of monomers and water, using a surfactant system consisting of one or more surfactants and an optional cosurfactant. It should be understood that it is possible to form microemulsions of silicone monomers with a wide variety of surfactant systems, and so the surfactants described below are merely representative.

Thus, the surfactant can be a silicone polyether surfactant or it can be an organic surfactant.

The silicone polyether should be one which is generally water-soluble or water dispersible. It can have a rake type structure wherein the polyoxyethylene or polyoxyethylene-polyoxypropylene copolymeric units are grafted onto the siloxane backbone, or the SPE can have an ABA block copolymeric structure wherein A represents the polyether portion and B the siloxane portion of an ABA structure.

Silicone polyethers suitable for use herein have the formula $MD_{0-1,000}D'_{1-100}M$, most preferably the formula $MD_{0-500}D'_{1-50}M$, where M represents monofunctional unit $R_3SiO_{1/2}$, D represents difunctional unit $R_2SiO_{2/2}$, and D' represents difunctional unit $RR'SiO_{2/2}$. In these formulas, R is an alkyl group containing 1–6 carbon atoms or an aryl group, and R' is an oxyalkylene containing moiety. The R' groups may contain only oxyethylene (EO) units; a combination of oxyethylene (EO) and oxypropylene (PO) units; or a combination of oxyethylene (EO) units, oxypropylene (PO) units, and oxybutylene (BO) units. Preferred R' groups include oxyalkylene units in the ratio of $EO_{3-100}PO_{0-100}$, most preferably in the ratio $EO_{3-30}PO_{1-30}$.

R' moieties typically includes a divalent radical such as —$C_m H_{2m}$— where m is 2–8 for connecting the oxyalkylene portion of R' to the siloxane backbone. Such moieties also contain a terminating radical for the oxyalkylene portion of R' such as hydrogen, hydroxyl, or an alkyl, aryl, alkoxy, or acetoxy group.

Silicone polyethers useful herein can also be of a type having the formula $M'D_{10-1,000}D'_{0-100}M'$, most preferably the formula $M'D_{10-500}D'_{0-50}M'$, wherein M' represents monofunctional unit $R_2R'SiO_{1/2}$, D represents difunctional unit $R_2SiO_{2/2}$, and D' represents difunctional unit $RR'SiO_{2/2}$. In these formulas, R can be an alkyl group containing 1–6 carbon atoms or an aryl group, and again R' represents an oxyalkylene containing moiety. As noted previously, R' groups typically contain only oxyethylene (EO) units or combinations of oxyethylene (EO) and oxypropylene (PO) units. Such R' groups include these oxyalkylene units in the ratio $EO_{3-100}PO_{0-100}$, most preferably $EO_{3-30}PO_{1-30}$.

As also noted previously, R' moieties typically include a divalent radical —$C_m H_{2m}$— where m is 2–8 for connecting the oxyalkylene portions of R' to the siloxane backbone. In addition, the moiety R' contains a terminating radical for oxyalkylene portions of R' such as hydrogen, hydroxyl, an alkyl, aryl, alkoxy, or acetoxy group.

In addition, silicone polyethers useful herein can be of a type having the formula $MD_{0-1,000}D'_{0-100}D''_{1-1,00}M$ wherein D" represents difunctional unit $RR''SiO_{2/2}$, and R" is an alkyl group containing 1–40 carbon atoms. M, D, D', and R, are the same as defined above.

These silicone polyethers are known in the art and are commercially available from Dow Corning Corporation, Midland, Michigan. One silicone polyether especially preferred for use herein is the short chain linear silicone polyether 1,1,1,3,5,5,5-heptamethyl-3-[propyl(polyEO$_7$) hydroxy)]trisiloxane.

While such silicone polyethers are capable of functioning as the sole emulsifying agent, other types of organic surfactants can be used, either in place of or in combination with the silicone polyether surfactant, if desired.

Such other surfactants can be nonionic, cationic, anionic, amphoteric (zwitterionic), or mixtures of such surfactants. Nonionic surfactants most preferred are alcohol ethoxylates $R2-(OCH_2CH_2)_xOH$, most particularly fatty alcohol ethoxylates. Fatty alcohol ethoxylates typically contain the characteristic group $-(OCH_2CH_2)_xOH$ which is attached to fatty hydrocarbon residue R2 which contains about eight to about twenty carbon atoms, such as lauryl ($C_{12}$), cetyl ($C_{16}$) and stearyl ($C_{18}$). While the value of x may range from 1 to about 100, its value is typically in the range of 2 to 40.

Some examples of suitable nonionic surfactants are polyoxyethylene (4) lauryl ether, polyoxyethylene (5) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, and polyoxyethylene (10) oleyl ether. These and other fatty alcohol ethoxylates are commercially available under names such as ALFONIC®, ARLACEL, BRIJ, GENAPOL®, LUTENSOL, NEODOL®, RENEX, SOFTANOL, SURFONIC®, TERGITOL®, TRYCOL, and VOLPO.

Cationic surfactants useful in the invention include compounds having quaternary ammonium hydrophilic moieties in the molecule which are positively charged, such as quaternary ammonium salts represented by $R3R4R5R6N^+ X^-$ where R3 to R6 are alkyl groups containing 1–30 carbon atoms, or alkyl groups derived from tallow, coconut oil, or soy; and X is halogen such as chlorine or bromine, or X can be a methosulfate group. Most preferred are (i) dialkyldimethyl ammonium salts represented by $R7R8N^+(CH_3)_2X^-$, where R7 and R8 are alkyl groups containing 12–30 carbon atoms, or alkyl groups derived from tallow, coconut oil, or soy; and X is halogen or a methosulfate group; or (ii) monoalkyltrimethyl ammonium salts represented by $R9N^+ (CH_3)_3X^-$ where R9 is an alkyl group containing 12–30 carbon atoms, or an alkyl group derived from tallow, coconut oil, or soy; and X is halogen or a methosulfate group.

Representative quaternary ammonium salts are dodecyltrimethyl ammonium bromide (DTAB), dodecyltrimethyl ammonium chloride, tetradecyltrimethyl ammonium bromide, tetradecyltrimethyl ammonium chloride, hexadecyltrimethyl ammonium bromide, hexadecyltrimethyl ammonium chloride, didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, and ditallowdimethyl ammonium bromide. These and other quaternary ammonium salts are commercially available under names such as ADOGEN, ARQUAD, SERVAMINE, TOMAH, and VARIQUAT.

Examples of anionic surfactants include sulfonic acids and their salt derivatives such as dodecylbenzene sulfonic acid (DBSA); alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates such as sodium lauryl (dodecyl) sulfate (SDS); ether sulfates having alkyl groups of eight or more carbon atoms; and alkylaryl sulfonates having one or more alkyl groups of eight or more carbon atoms.

Commercial anionic surfactants useful herein include triethanolamine linear alkyl sulfonate sold under the name BIO-SOFT N-300 by the Stepan Company, Northfield, Ill.; sulfates sold under the name POLYSTEP by the Stepan Company; and sodium n-hexadecyl diphenyloxide disulfonate sold under the name DOWFAX 8390 by The Dow Chemical Company, Midland, Mich.

Surfactants classified as amphoteric or zwitterionic include cocoamphocarboxy glycinate, cocoamphocarboxy propionate, cocobetaine, N-cocamidopropyldimethyl glycine, and N-lauryl-N-carboxymethyl-N-(2-hydroxyethyl)ethylene diamine. Other suitable amphoteric surfactants include the quaternary cycloimidates, betaines, and sultaines.

The betaines have the structure $R11R12R13N^+ (CH_2)_nCOO^-$ wherein R11 is an alkyl group having about twelve to eighteen carbon atoms or a mixture thereof, R12 and R13 are independently lower alkyl groups having one to three carbon atoms, and n is an integer from one to four. Specific betaines are α-(tetradecyldimethylammonio)acetate, β-(hexadecyldiethylammonio)propionate, and γ-(dodecyldimethylammonio)butyrate.

The sultaines have the structure $R11R12R13N^+ (CH_2)_nSO_3^-$ where R11, R12, R13 and n are defined above. Useful sultaines include 3-(dodecyldimethylammonio)-propane-1-sulfonate and 3-(tetradecyldimethylammonio) ethane-1-sulfonate.

Representative amphoteric surfactants are products sold under the names MIRATAINE® by Rhone-Poulenc Incorporated, Cranberry, N.J.; and TEGO BETAINE by Goldschmidt Chemical Corporation, Hopewell, Virginia. Imidazoline and imidazoline derivatives sold under the name MIRANOL® by Rhone-Poulenc Incorporated, Cranberry, N.J. may also be employed.

Optional Components

Since emulsions are susceptible to microbiological contamination, a preservative can be used as an optional component in the emulsion. Representative of some compounds which can be used include formaldehyde, salicylic acid, phenoxyethanol, DMDM hydantoin, i.e., 1,3-dimethylol-5,5-dimethyl hydantoin, 5-bromo-5-nitro-1,3-dioxane, methyl paraben, propyl paraben, sorbic acid, imidazolidinyl urea sold under the name GERMALL® II by Sutton Laboratories, Chatham, N.J. sodium benzoate, 5-chloro-2-methyl-4-isothiazolin-3-one sold under the name KATHON CG by Rohm & Haas Company, Philadelphia, Pa., and iodopropynl butyl carbamate sold under the name GLYCACIL® L by Lonza Incorporated, Fair Lawn, N.J.

Addition of a cosurfactant such as a short chain alcohol may also be necessary to form a microemulsion phase with many organic and siloxane surfactants. Representative examples of such cosurfactants are 1-butanol, 1-pentanol, 1-decanol, 1-hexadecanol, ethylene glycol, propylene glycol, trimethylene glycol, and glycerol.

A freeze/thaw stabilizer can be used as an optional component of the emulsion. Representative compounds include ethylene glycol, propylene glycol, glycerol, trimethylene glycol, and polyoxyethylene ether alcohols such as products sold under the name RENEX 30 by ICI Surfactants, Wilmington, Del.

Salts other than salts mentioned above as surfactants can be used as an optional component. These salts can be inorganic salts or organic salts such as compositions generally referred to as an electrolyte. Their inclusion in the composition is primarily for the purpose of expanding the region in which the microemulsion phase forms for compositions that include ionic surfactants.

Some examples of inorganic salts which can be used are calcium chloride, magnesium sulfate, magnesium chloride, sodium sulfate, sodium thiosulfate, sodium chloride, sodium phosphate, ammonium chloride, ammonium carbonate, iron sulfate, aluminum sulfate, aluminum chloride, aluminum chlorohydrate, aluminum sesquichlorohydrate, aluminum dichlorohydrate, aluminum zirconium tetrachorohydrex glycine, aluminum zirconium trichlorohydrate, aluminum zirconium tetrachlorohydrate, aluminum zirconium pentachlorohydrate, and aluminum zirconium octachlorohydrate.

Suitable organic salts include sodium aluminum lactate, sodium acetate, sodium dehydroacetate, sodium butoxy ethoxy acetate, sodium caprylate, sodium citrate, sodium lactate, sodium dihydroxy glycinate, sodium gluconate, sodium glutamate, sodium hydroxymethane sulfonate, sodium oxalate, sodium phenate, sodium propionate, sodium saccharin, sodium salicylate, sodium sarcosinate, sodium toluene sulfonate, magnesium aspartate, calcium propionate, calcium saccharin, calcium d-saccharate, calcium thioglycolate, aluminum caprylate, aluminum citrate, aluminum diacetate, aluminum glycinate, aluminum lactate, aluminum methionate, aluminum phenosulfonate, potassium aspartate, potassium biphthalate, potassium bitartrate, potassium glycosulfate, potassium sorbate, potassium thioglycolate, potassium toluene sulfonate, and magnesium lactate.

Amounts of Components

The oil component of the microemulsion consists of the organosilicon oligomers in an amount of about 0.1–50 percent by weight based on the total weight of the microemulsion. The surfactants are used in amounts of about 1–30 percent by weight including any cosurfactants which may be present, based on the total weight of the microemulsion. Water constitutes about 20–98.9 percent by weight based on the total weight of the microemulsion. The transition metal catalyst or free radical initiator constitutes about 1–5,000 parts per million by weight based on the weight of the oil phase. The amount of optional components can be from zero to about ten percent by weight based on the total weight of the microemulsion.

Microemulsions, emulsions, latexes, and suspensions according to the invention can be prepared without application of high shear, and do not require the use of special equipment for producing high shear, such as propeller mixers, turbine-type mixers, Brookfield counter-rotating mixers, or homogenizing mixers. In many cases, simple handshaking is sufficient, or a simple laboratory stirring device will be adequate.

EXAMPLES

The following examples are set forth in order to illustrate this invention in more detail.

Example 1

Formation of a Latex 0.383 gram of the cyclic alkenyl functional organosilicon oligomer 1,3,5,7-tetravinyl-1,3,5,7-tetramethyl cyclotetrasiloxane, 0.217 gram of the linear hydride functional organosilicon oligomer 1,1,3,3,5,5,7,7-octamethyltetrasiloxane, 0.454 gram of the nonionic silicone polyether surfactant 1,1,1,3,5,5,5-heptamethyl-3-[propyl (polyEO$_7$)hydroxy)]trisiloxane, and 1.955 gram of an aqueous buffer solution having a pH of 6, were added to a 22 ml graduated cylinder which had a Teflon® coated magnetic stirring bar. The cylinder was placed in a temperature controlled water bath at 30° C., the contents were stirred, and a clear, isotropic microemulsion was formed.

0.011 gram of a platinum catalyst was added to the microemulsion. The platinum catalyst was a neutralized complex of platinous chloride and 1,3-divinyltetramethyldisiloxane. It is described in U.S. Pat. No. 5,175,325 (Dec. 29, 1992). After one hour, the contents in the cylinder appeared as an emulsion with a blue tint, which is consistent with the Tyndall Effect. As is well known in the art, light scattering, which is often referred to as the Tyndall Effect, is related to the particle size of components dispersed within a medium. Typically, macroemulsions appear opaque white, while microemulsions with smaller particles appear bluish and translucent because of light scattering.

The reaction was allowed to continue for 7 hours, after which the volume weighted particle size was measured and determined to be 0.29 micron (micrometer). The emulsion was broken with pentane, methanol and $CaCl_2$, and the resultant polymeric phase was found to be insoluble in pentane, which is consistent with the formation of a silicone network.

Example 2

Formation of a Suspension 4.2 gram of the cyclic alkenyl functional organosilicon oligomer 1,3,5,7-tetravinyl-1,3,5,7-tetramethyl cyclotetrasiloxane; 3.2 gram of the linear hydride functional organosilicon oligomer 1,1,3,3,5,5,7,7-octamethyltetrasiloxane; 37.0 gram of an aqueous solution containing 20 percent by weight of sodium lauryl (dodecyl) sulfate (SDS) as anionic surfactant; and 5.55 gram of 1-pentanol; were added to a 100 mL, three necked, round bottom, flask fitted with a glass stirring rod and a Teflon® paddle, stopper, condenser, and a temperature probe. A clear, isotropic microemulsion was formed. The flask was heated to 50° C. using a temperature controller and heating mantle, and there was added to the flask 0.135 gram of a solution containing 26.67 percent by weight of platinum metal in 1,3-divinyltetramethyldisiloxane. An exotherm was observed and the reaction mixture turned hazy and yellow. After about 3 hours, however, the material in the flask was no longer yellow in color. A sample was observed under a microscope at SOX magnification and found to contain particulate matter.

Example 3

Formation of a Film

A microemulsion containing a cyclic alkenyl functional organosilicon oligomer and a catalyst was prepared by adding 0.018 gram of the platinum catalyst used in Example 1 to 100 gram of 1,3,5,7-tetravinyl-1,3,5,7-tetramethyl cyclotetrasiloxane. One gram of the platinum metal catalyst solution and 2.65 gram of nonionic silicone polyether surfactant 1,1,1,3,5,5,5-heptamethyl-3-[propyl(poly $EO_7$) hydroxy)]trisiloxane, were added to a one ounce vial containing 12.0 gram of an aqueous buffer solution having a pH of 6. The vial was mixed by hand until a clear mixture had been obtained at room temperature.

A microemulsion containing a linear hydride functional organosilicon oligomer was prepared by adding 3.0 gram of 1,1,3,3,5,5,7,7-octamethyltetrasiloxane, and 2.65 gram of the nonionic silicone polyether surfactant 1,1,1,3,5,5,5-heptamethyl-3-[propyl(poly $EO_7$)hydroxy)]trisiloxane, to a one ounce vial containing 12.0 gram of an aqueous buffer solution having a pH of 6. The vial was mixed by hand until a clear mixture had been obtained at room temperature.

5.12 gram of the microemulsion containing the cyclic alkenyl functional organosilicon oligomer and catalyst was added to an aluminum pan in which there was 2.88 gram of the microemulsion containing the linear hydride functional organosilicon oligomer. The concentration of platinum metal in the mixture was about 10 parts per million based on the total weight of the silicone phase. The microemulsions were mixed with a spatula. The pan was placed in a 110° C. oven overnight. The next morning, a film was observed in the pan. The film was hard, smooth, and very mar resistant.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making an emulsion or latex containing polymer particles with a diameter greater than 0.02 micron (micrometer) comprising (i) forming a microemulsion containing particles of oligomers with a diameter less than 0.02 micron (micrometer) by combining water, at least one surfactant, a hydride functional organosilicon oligomer or a mixture of such oligomers, and an alkenyl functional organosilicon oligomer or a mixture of such oligomers; (ii) adding a hydrosilylation catalyst to the microemulsion; (iii) initiating polymerization of the oligomers; and (iv) continuing polymerization until an emulsion or latex is formed containing polymer particles with a diameter greater than 0.02 micron (micrometer); the oligomers each having a viscosity of 1–50 centistoke (mm²/s), and at least one of the oligomers containing more than two reactive sites.

2. A method according to claim 1 in which the oligomers have a formula selected from the group consisting of

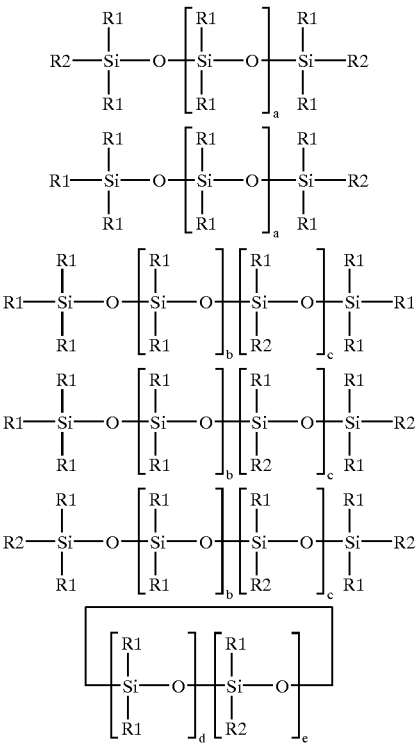

where R1 is an alkyl group containing 1–6 carbon atoms or an aryl group; R2 is hydrogen or an alkenyl group; a and b are each 0–10, c is 1–10, and provided the sum of b and c is 1–10; and d and e are each 0–10 provided the sum of d and e is 3–10.

3. A method of making an emulsion or latex containing polymer particles with a diameter greater than 0.02 micron (micrometer) comprising (i) forming a first microemulsion containing particles of oligomers with a diameter less than 0.02 micron (micrometer) by combining water, at least one surfactant, and a hydride functional organosilicon oligomer or a mixture of such oligomers; (ii) forming a second microemulsion containing particles of oligomers with a diameter less than 0.02 micron (micrometer) by combining water, at least one surfactant, an alkenyl functional organosilicon oligomer or a mixture of such oligomers, and a hydrosilylation catalyst; (iii) combining the first microemulsion and the second microemulsion to initiate polymerization of the oligomers; and (iv) continuing polymerization until an emulsion or latex is formed containing polymer particles with a diameter greater than 0.02 micron (micrometer); the oligomers each having a viscosity of 1–50 centistoke (mm²/s), and at least one of the oligomers containing more than two reactive sites.

4. A method according to claim 3 in which the oligomers have a formula selected from the group consisting of

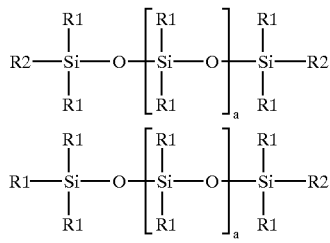

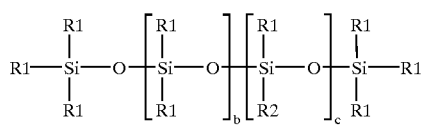
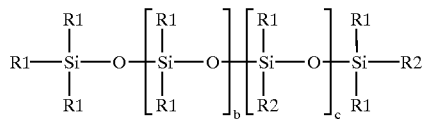
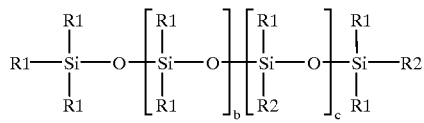
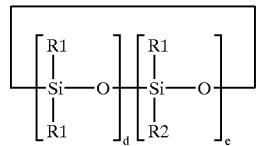
where R1 is an alkyl group containing 1–6 carbon atoms or an aryl group; R2 is hydrogen or an alkenyl group; a and b are each 0–10, c is 1–10, provided the sum of b and c is 1–10; and d and e are each 0–10 provided the sum of d and e is 3–10.
* * * * *